United States Patent
Webster, Jr. et al.

(10) Patent No.: US 10,781,337 B2
(45) Date of Patent: Sep. 22, 2020

(54) THERMOSETTING COATING COMPOSITION FOR IMPROVED CORROSION PROTECTION OF METAL SUBSTRATES

(71) Applicant: Eastman Chemical Company, Kingsport, TN (US)

(72) Inventors: Geoffrey Richard Webster, Jr., Kingsport, TN (US); Joseph Connell Tilly, Raleigh, NC (US)

(73) Assignee: Eastman Chemical Company, Kingsport, TN (US)

( * ) Notice: Subject to any disclaimer, the term of this patent is extended or adjusted under 35 U.S.C. 154(b) by 38 days.

(21) Appl. No.: 16/046,262

(22) Filed: Jul. 26, 2018

(65) Prior Publication Data

US 2020/0032100 A1    Jan. 30, 2020

(51) Int. Cl.
| | |
|---|---|
| *C09D 175/06* | (2006.01) |
| *C08G 18/24* | (2006.01) |
| *C08G 18/40* | (2006.01) |
| *C08G 18/42* | (2006.01) |
| *C08G 18/62* | (2006.01) |
| *C08G 18/71* | (2006.01) |
| *C09D 5/08* | (2006.01) |

(52) U.S. Cl.
CPC ......... *C09D 175/06* (2013.01); *C08G 18/246* (2013.01); *C08G 18/4081* (2013.01); *C08G 18/42* (2013.01); *C08G 18/622* (2013.01); *C08G 18/715* (2013.01); *C09D 5/08* (2013.01)

(58) Field of Classification Search
None
See application file for complete search history.

(56) References Cited

U.S. PATENT DOCUMENTS

| | | | |
|---|---|---|---|
| 4,387,151 A | 6/1983 | Bosse et al. | |
| 4,525,444 A * | 6/1985 | Doessel | C08G 18/715 |
| | | | 430/906 |
| 8,703,896 B2 * | 4/2014 | Wang | C08G 18/544 |
| | | | 528/45 |

FOREIGN PATENT DOCUMENTS

| | | | |
|---|---|---|---|
| EP | 0 919 582 A1 | 6/1999 | |
| JP | 2 985222 B2 | 11/1999 | |
| JP | 2985222 B2 * | 11/1999 | ........... C08G 18/089 |
| JP | 2000 143757 A | 5/2000 | |
| JP | 2004 256679 A | 9/2004 | |
| JP | 2004256679 A * | 9/2004 | |
| JP | 2010 018755 A | 1/2010 | |
| KR | 20130011524 A * | 1/2013 | |

OTHER PUBLICATIONS

JP-2004256679-A, Sep. 2004, Machine translation (Year: 2004).*

(Continued)

*Primary Examiner* — Satya B Sastri
(74) *Attorney, Agent, or Firm* — Matthew W. Smith (57) ABSTRACT

Disclosed is a composition for improving the corrosion resistance of metals coated with 2K coatings. The composition comprises the reaction product of an aromatic sulfonyl isocyanate and an alcohol or polyol monomer. Also disclosed is a method of improving the corrosion resistance of metals coated with 2K coatings by the addition of a sulfonyl urethane-alcohol composition reaction product of an aromatic sulfonyl isocyanate and a mono-alcohol or polyalcohol.

7 Claims, 6 Drawing Sheets

(56) References Cited

OTHER PUBLICATIONS

KR 20130011524 A, Jan. 2013, Derwent Ab (Year: 2013).*
JP-2985222-B2, Nov. 1999, Machine translation (Year: 1999).*
Co-pending U.S. Appl. No. 16/046,256, filed Jul. 26, 2018; Webster et al.
ASTM 8117—Standard Practice for Operating Salt Spray (Fog) Aparatus.
ASTM D7869—Standard Practice for Xenon Arc Exposure Test with Enhanced Light and Water Exposure for Transportation Coatings.
ASTM G154—Standard Practice for Operating Fluorescent Ultraviolet (UV) Lamp Apparatus for Exposure of Nonmetallic Materials.
Wicks et al.; "Chapter 13—Polyester Resins;" Organic Coatings Science and Technology; $2^{nd}$ ed.; 1999; pp. 246-257.
Oldring et al.; "Chapter X—Polyester Resins;" A Manual of Resins for Surface Coatings; vol. III; 1987; pp. 63-167.
Notification of Transmittal of the International Search Report and the Written Opinion of the International Searching Authority dated Oct. 30, 2019 received in International Application No. PCT/US2019/042168.
Notification of Transmittal of the International Search Report and the Written Opinion of the International Searching Authority dated Nov. 8, 2019 received in International Application No. PCT/US2019/042170.
USPTO Office Action dated Apr. 1, 2020 received in co-pending U.S. Appl. No. 16/046,256.

* cited by examiner

FIG. 1

Fig. 2: Plot of corrosion width (mm) on shot blasted steel for Tetrashield IC3020 and Nuplex acrylic.

Fig 3: Plot of corrosion width (mm) on iron phosphated steel for Tetrashield IC3020 and Nuplex acrylic.

Fig. 4: Plot of corrosion width (mm) on Iron Phosphate Treated Cold Rolled Steel (B1000) at 250 hours.

Fig. 5: Plot of corrosion width (mm) on Iron Phosphate Treated Cold Rolled Steel (B1000) at 750 hours.

Figure 6: Plot of corrosion width (mm) on Iron Phosphate Treated Cold Rolled Steel (B1000) for Coatings at 250 hours.

Fig. 7: Plot of corrosion width (mm) on Iron Phosphate Treated Cold Rolled Steel (B1000) for Coatings at 750 hours.

THERMOSETTING COATING COMPOSITION FOR IMPROVED CORROSION PROTECTION OF METAL SUBSTRATES

FIELD OF THE INVENTION

The invention generally relates to the field of organic chemistry. In particular, it relates to the use of a grafted resin and a sulfonyl urethane-alcohol composition in a coating composition to improve corrosion resistance of metal substrates. More particularly it relates to reacting an aromatic sulfonyl isocyanate to an alcohol or polyol monomer creating a sulfonyl urethane and incorporating this into a 2K coating composition to improve corrosion. Even more particularly it relates to grafting a sulfonyl isocyanate to active sites on a polyester, polyacrylic or other polyol resin and using the grafted resin with the sulfonyl urethane-alcohol composition reaction product of an aromatic sulfonyl isocyanate and a mono-alcohol or poly-alcohol in a 2K coating composition to provide improved corrosion resistance of metal substrates.

BACKGROUND OF THE INVENTION

In many coating applications, a primer is used to provide corrosion protection to a metal substrate, and one or more layers of coatings are applied above the primer to provide good weathering and appearance. Many attempts have been made to develop a single layer, direct to metal coating, for use in protective maintenance and original equipment manufacturing (OEM) coatings. In general, these coatings do not perform as well as desired by the market. The present invention addresses this need as well as others, which will become apparent from the following description and the appended claims.

For protective coatings and OEM coatings requiring high levels of corrosion protection for the metal substrate, the current state of the art is multiple coating layers. In general, an anticorrosive primer and a weatherable protective topcoat are typically applied to a metal substrate. This multiple layer system adds both labor and material cost to coatings designed for use in OEM and coatings for infrastructure maintenance.

There have been many attempts for single layer or direct to metal coatings (DTM), but performance is generally a compromise. To have good weathering, they need to be non-aromatic. These types of coatings have been shown to have weak adhesion to many metal substrates, such as cold rolled steel, galvanized steel or substrates with phosphate pretreatments. This is observed by rapid adhesion failure in very short periods in corrosion testing such as ASTM B117.

Polyester polyols based on 2,2,4,4, tetramethyl 1,3 cyclobutane diol (TMCD) show superior DTM corrosion compared to conventional acrylic polyols over rough (SP10 shot blasted) steel. However, on smooth substrates, such as cold rolled steel, galvanized steel, iron phosphated steel, there is little differentiation between the acrylic polyols and TMCD polyester polyols.

A need exists for a resin when used in a paint formulation that significantly improves metal corrosion resistance of single layer protective maintenance and OEM coatings. The present invention addresses this need as well as others, which will become apparent from the following description and the appended claims.

SUMMARY OF THE INVENTION

The invention is as set forth in the appended claims.

Briefly, the invention provides a sulfonyl isocyanate-alcohol composition for use in a coating.

In another embodiment the invention provides a composition for use in a coating comprising a sulfonyl urethane-alcohol reaction product of a mono-alcohol or a poly alcohol or a mixture thereof with an aromatic sulfonyl isocyanate wherein said sulfonyl urethane-alcohol reaction product has less than 100% sulfonyl urethane groups.

In another embodiment the invention provides a compound for use in a coating comprising: a) a resin composition including a polyol component having not more than 25 percent sulfonyl urethane groups; and b) a sulfonyl urethane-alcohol composition having less than 100% sulfonyl urethane groups.

In another embodiment the invention provides a compound for use in a coating comprising;
 a. a sulfonyl isocyanate-alcohol composition;
 b. a polyol resin;
 c. a solvent other than water; and
 d. a polymeric isocyanate.

In another embodiment the invention provides a coating composition comprising:
 a. at least one acrylic resin comprising residues of an acrylic polyol and an aromatic sulfonyl isocyanate wherein said resin has not more than 25 percent sulfonyl urethane groups and not less than 75 percent remaining hydroxyl groups;
 b. a sulfonyl urethane-alcohol compound wherein said compound has less than 100% sulfonyl urethane groups;
 c. a solvent other than water; and
 d. a crosslinker comprising a polymeric isocyanate, wherein said isocyanate is selected from the group consisting of an aliphatic poly isocyanate; an aromatic poly isocyanate, an aliphatic isocyanate; an aromatic isocyanates and mixtures thereof.

In another embodiment the invention provides a composition for use in a coating comprising the residues of:
 a. a grafted polymer comprising the residue of:
  i. a polyol having an initial OH Fn greater than 2.66; and
  ii. an aromatic sulfonyl isocyanate wherein said polymer has not more than 25 percent sulfonyl urethane groups and not less than 75 percent remaining hydroxyl groups; and
 b. a sulfonyl urethane-alcohol compound wherein said compound has less than 100% sulfonyl urethane groups.

In another embodiment the invention provides a coating composition comprising:
 a. at least one polyester resin comprising residues of a polyester polyol and an aromatic sulfonyl isocyanate wherein said resin has not more than 25 percent sulfonyl urethane groups and not less than 75 percent hydroxyl groups;
 b. a sulfonyl urethane-alcohol compound wherein said compound has less than 100% sulfonyl urethane groups;
 c. a solvent other than water; and
 d. a crosslinker comprising a polymeric isocyanate, wherein said isocyanate is selected from the group consisting of an aliphatic poly isocyanate; an aromatic poly isocyanate, an aliphatic isocyanate; an aromatic isocyanates and mixtures thereof.

In another embodiment the invention further provides a coating composition further comprising e) an ungrafted aromatic sulfonyl isocyanate.

In another embodiment the invention provides a coating composition comprising:
a. at least one acrylic resin comprising residues of an acrylic polyol and an aromatic sulfonyl isocyanate wherein said resin has not more than 25 percent sulfonyl urethane groups and not less than 75 percent remaining hydroxyl groups;
b. a sulfonyl urethane-alcohol compound wherein said compound has less than 100% sulfonyl urethane groups;
c. a solvent other than water; and
d. crosslinker comprising a polymeric isocyanate, wherein said isocyanate is selected from the group consisting of an aliphatic poly isocyanate; an aromatic poly isocyanate, an aliphatic isocyanate; an aromatic isocyanates and mixtures thereof.

In another embodiment the invention further provides a coating composition further comprising e) an ungrafted aromatic sulfonyl isocyanate.

In another embodiment the invention provides a method of improving the corrosion resistance of a metal substrate comprising:
a. forming a polyester resin, said resin comprising the residues of at least two polyol components and at least one acid component wherein at least one of said polyol components contains free hydroxyl functionality;
b. reacting an aromatic sulfonyl isocyanate with said resin to form a grafted polyester resin wherein said grafted polyester resin has not more than 25 percent sulfonyl urethane groups and not less than 75 percent hydroxyl groups;
c. reacting an aromatic sulfonyl isocyanate with a mono-alcohol or a poly-alcohol or a combination thereof to form a sulfonyl urethane-alcohol compound wherein said sulfonyl urethane-alcohol compound has less than 100% percent sulfonyl urethane groups;
d. combining said grafted polyester and said sulfonyl urethane-alcohol compound with a coating composition; and
e. coating said metal substrate with said combined grafted polyester, sulfonyl urethane-alcohol compound and coating composition.

In another embodiment the invention provides a method of improving the corrosion resistance of a metal substrate comprising:
a. forming an acrylic polyol resin, said resin comprising the residues of the radical copolymerization of an acrylic monomer with an ester wherein at least one of said acrylic polyol components contains free hydroxyl functionality;
b. reacting an aromatic sulfonyl isocyanate with said acrylic polyol resin to form a grafted acrylic polyol resin wherein said grafted acrylic polyol resin has not more than 25 percent sulfonyl urethane groups and not less than 75 percent hydroxyl groups;
c. reacting an aromatic sulfonyl isocyanate with a mono-alcohol or a poly-alcohol or a combination thereof to form a sulfonyl urethane-alcohol compound wherein said sulfonyl urethane-alcohol compound has 33-67% percent sulfonyl urethane groups and 67-33% alcohol groups wherein the total groups on said sulfonyl urethane-alcohol compound equal 100%;
d. combining said grafted acrylic polyol resin and said sulfonyl urethane-alcohol compound with a coating composition; and coating said metal substrate with said combined grafted acrylic polyol resin, sulfonyl urethane-alcohol compound and coating composition.

BRIEF DESCRIPTION OF THE DRAWINGS

The detailed description is described with reference to the accompanying figures.

DETAILED DESCRIPTION OF THE INVENTION

As used herein the term "polyol" means an organic compound containing multiple hydroxyl groups. For purposes of this application, a "diol" is a polyol having two hydroxyl groups.

The term "polyester polyol" means a polymer resulting from the polycondensation of a diacid or polyacid with a diol or polyol with sufficient excess alcohol to ensure non-gelation.

The term "acrylic polyol" means a polymer resulting from radical copolymerization of acrylic monomers (ternary or quaternary copolymers), such as acrylic or methacrylic acids with esters.

The term "grafting" means formation of a chemical bond between hydroxyl functionality of a polyol and an aromatic sulfonyl isocyanate to form a urethane linkage.

The term "1K coating" means a coating that does not require a hardener, catalyst or activator to cure.

The term "2K coating" means a coating that requires a hardener, catalyst or activator to cure.

While attempts have been made to be precise, the numerical values and ranges described herein should be considered approximations (even when not qualified by the term "about"). These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to describe and include all values within the range including sub-ranges such as 60 to 90 and 70 to 80.

Unless indicated to the contrary, the numerical parameters set forth in the following specification and attached claims are approximations that may vary depending upon the desired properties sought to be obtained by the present invention. At the very least, each numerical parameter should be construed considering the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "polyester", as used herein, is synonymous with the term "resin" and is intended to mean a thermosetting surface coating polymer prepared by the polycondensation of one or more acid components and hydroxyl components. The curable, aliphatic polyester of the present invention is a thermoset polymer and is suitable as a resin for solvent-based coatings and more specifically mono-coat applications. This polyester has a low molecular weight, typically 500 to 10,000 Daltons, and may not be suitable for fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid, or 1,2-cyclohexanedicarboxylic acid, or 1,3-cyclohexanedicarboxylic acid, or a mixture of one or more aliphatic and cycloaliphatic acids. The hydroxyl component comprises diols and polyols. The diols may comprise one or more cycloaliphatic diols such as, for example, 2,2,4,4-tetramethyl-1,3-cyclobutanediol (TMCD), either alone or in combination with one or more linear or branched aliphatic diols such as, for example, neopentyl glycol. Catalysts may be used to accelerate the rate of the polycondensation reaction. Additional examples of acid components and hydroxyl components, other than TMCD of the curable, aliphatic polyester include those known in the art including, but not limited to, those discussed below, and in various documents known in the art such as, for example, in *Resins for Surface Coatings*, Vol. III, p. 63-167, ed. by P. K. T. Oldring and G. Hayward, SITA Technology, London, U K, 1987.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

Paratoluenesulfonyl isocyanate (PTSI) is an isocyanate material commonly used as an additive to coating systems to remove moisture that has been introduced with solvents, pigments, and fillers in 1K and 2K polyurethane systems.

Instead of merely adding PTSI to a coating formulation as a water scavenger, we have discovered that grafting a sulfonyl isocyanate onto a polyol resin (forming tosyl urethane substituents), and incorporating the grafted resin into 2K coating systems can significantly improve metal corrosion on smooth metal substrates.

In addition, we have also discovered that a tosyl urethane-alcohol composition reaction product of an PTSI and a mono-alcohol or poly-alcohol when added to a coating composition containing a grafted resin also improves corrosion resistance of coated metal substrates.

The grafted resins and sulfonyl urethane-alcohol compositions of this invention have utility when the resins are polyester polyols and acrylic polyols. The initial polyol OH Fn should be greater than 2.0, preferably >2.5 and after reacting with an aromatic sulfonyl isocyanate the resulting grafted polyol resin preferably maintain OH Fn>2.

Suitable polyester resins for use in this invention are aliphatic polyester compositions comprising the residues:

a) of 2,2,4,4-tetraalkylcyclobutane-1,3-diol (TACD) represented by the structure:

wherein R1, R2, R3, and R4 each independently are $C_1$ to $C_8$ alkyls; and b) a diacid component In particular, polyesters comprising residues of TACD, and more particularly, 2,2,4,4-tetramethyl-1,3-cyclobutanediol (abbreviated herein as "TMCD") have utility when grafted with a sulfonyl isocyanate in coating compositions to improve metal corrosion resistance.

The TACD compounds can be represented by the general structure below:

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radical. Desirably, the polyhydroxyl compounds are hydrocarbons and do not contain atoms other than hydrogen, carbon and oxygen. Examples of suitable diols include 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably, the diol is selected from 2,2,4,4-tetraalkylcyclobutane-1,3-diol, 2,2-dimethyl-1,3-propanediol (neopentyl glycol), 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and combinations thereof.

The suitable diacid components are hexahydrophthalic anhydride (HHPA), tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, adipic acid, maleic anhydride, maleic acid, fumaric acid, itaconic anhydride, succinic acid, succinic anhydride, glutaric acid, itaconic acid, citraconic anhydride, citraconic acid, dodecanedioic acid, sebacic acid, azelaic acid, 1,3 cyclohexanedicarboxylic acid, 1,4 cyclohexanedicarboxylic acid, isophthalic acid, terephthalic acid and mixtures thereof.

Representative polyester polyols include Tetrashield™ IC3020, and Tetrashield™ IC3000 available commercially from Eastman Chemical Company, and Desmophen™ 7116 and 631 from Covestro AG.

Acrylic polyols also have utility in this invention. Representative acrylic polyols include Setalux™ 1903, 1905, 1906, 1910 available commercially from Allnex, and Joncryl™ 500, 906, 910 available commercially from BASF.

The sulfonyl urethane-alcohol composition reaction product is made by reacting an alcohol with an aromatic sulfonyl isocyanate and a mono- or poly-alcohol.

Suitable mono-alcohols for use in making sulfonyl urethane-alcohol compositions include methanol, ethanol, butanol, pentanol and higher molecular weight aliphatic alcohols, phenol, benzyl alcohol. Propylene glycol methyl ether, ethylene glycol methyl ether, diethylene glycol methyl ether, di propylene glycol methyl ether. ethylene glycol butyl ether, diethylene glycol butyl ether. Ethylene glycol hexyl ether, ethylene glycol phenol ether, amyl alcohol, diethylene glycol butyl ether, diethylene glycol mono ethyl ether, diacetone alcohol, dipropylene glycol methyl ether, dipropylene glycol butyl ether, ethylene glycol 2-ethylhexyl ether, ethylene glycol propyl ether ethylene glycol ethyl ether, diethylene glycol propyl ether, ethylene glycol methyl ether, 2 ethylhexanol, propylene glycol phenyl ether, propylene glycol propyl ether, and Texanol.

Suitable poly-alcohols for use in making sulfonyl urethane-alcohol compositions include 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably, the diol is selected from 2,2,4,4-tetraalkylcyclobutane-1,3-diol, 2,2-dimethyl-1,3-propanediol (neopentyl glycol), 1,2 cyclohexanedimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and combinations thereof.

The present invention includes and expressly contemplates any and all combinations of embodiments, features, characteristics, parameters, and/or ranges disclosed herein. That is, the invention may be defined by any combination of embodiments, features, characteristics, parameters, and/or ranges mentioned herein.

This invention can be further illustrated by the following examples of preferred embodiments thereof, although it will be understood that these examples are included merely for purposes of illustration and are not intended to limit the scope of the invention unless otherwise specifically indicated.

EXAMPLES

Figure 1:
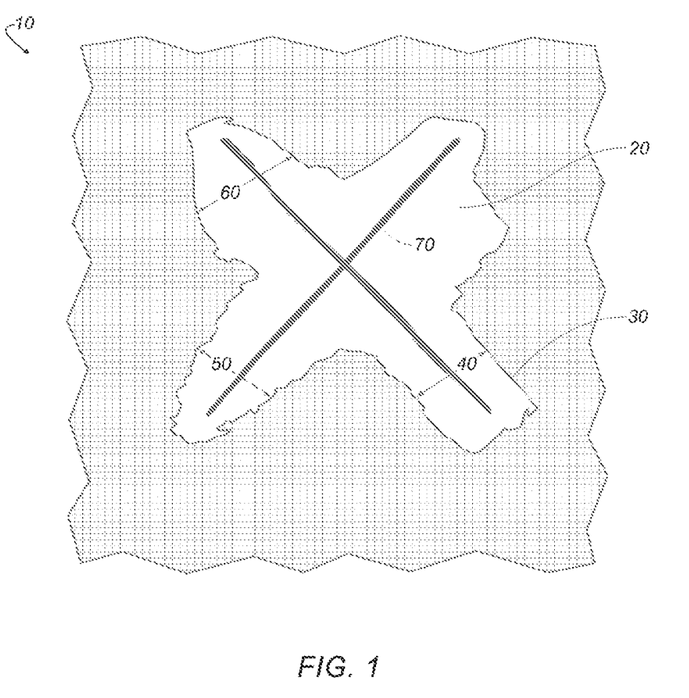
FIG. 1 is an illustration of a scribed panel.

Testing for paint examples: Corrosion testing was done by ASTM B117 with an "X" scribe in the painted panel according to standard ASTM protocols. Panels were rated after a specified amount of time by immersing in hot tap water for 30 minutes, then scraping with a steel spatula to remove all loose paint. A scribed and cleaned painted test panel is represented by 10 in FIG. 1. Painted metal is represented by the cross hatching. The initial "X" scribe on the painted test panel is represented by 70. Bare metal is represented at 20 and the paint-bare metal boundary is represented at 30. Bare metal arm width was measured by averaging three widths on a corroded panel (40, 50 and 60 in FIG. 1). The rater selected the three most consistent arms on the scribed panel for measurements.

The three measurements were recorded and averaged for each corrosion panel. Panels were run in duplicate, for each corrosion time, so reported data is an average of 6 measurements (in mm).

For many applications, like agricultural or construction equipment, corrosion is needed on multiple substrates. Two common metal substrates are shot blasted steel, (SSPC rated SP10), and iron phosphate pretreated steel. These substrates were purchased from ACT Test Panel Technologies as:

TABLE 1

Substrates for corrosion testing

| Abbreviation/<br>product code | Description | ACT part # |
|---|---|---|
| SBS | Shot blasted steel 1 mil profile | 56093 |
| B1000 | Iron Phosphate Treated Cold Rolled Steel | 10430 |

The shot blasted panels were received in a dry, foil protected bag and when the packets were opened, they were stored in a desiccator.

The paints were applied to the panels by roller to 7-9 mil wet film thickness. After curing for a minimum of 24 hrs. at room temperature, the panels were coated on the panel's back and edges with PPG Multiprime™ primer (available commercially from PPG Industries, Inc.) to eliminate corrosion from the uncoated surfaces. The panels were then allowed to cure for a minimum of 7 days prior to corrosion testing. Corrosion testing was done using ASTM B117 salt fog corrosion.

Example Set 1: Baseline Performance

Protective coatings were made and tested on SBS, and B1000 to test the corrosion resistance of Eastman Tetrashield™ IC3020 compared to Setalux™ 1903.

The following materials are listed in the tables:

Aromatic 100 is light aromatic naphtha solvent available from ExxonMobil.

IC3020™ is a polyester resin available commercially from Eastman Chemical Company.

Zoldine MS-Plus™ is a moisture scavenger available commercially from Angus Chemical.

Disperbyk 164™ is a wetting and dispersing additive available from BYK USA Inc.

BYK™-A501 is a release additive available from BYK USA Inc.

BYK™-306 is a silicone containing additive for coating systems available from BYK USA Inc.

BYK™-392 is a solution of a polyacrylate available from BYK USA Inc.

Crayvallac™ Ultra is a rheology modifier available from Arkema Inc.

Ti-Pure™ R960 is a titanium oxide pigment available from the Chemours Company.

Microtalc IT Extra is a talc available from Mondo Minerals B.V. Vulcan™ XC72R GP 3921 is a carbon black available from Cabot Corporation.

MICRODOL™ EXTRA is a calcium magnesium carbonate powder available from Omya Hustadmarmor AS, Knarrevik MAK is methyl amyl ketone available from Eastman Chemical Company.

Tinuvin™ 292 is a bis (1,2,2,6,6-pentamethyl-4-piperidyl) sebacate and methyl 1,2,2,6,6-pentamethyl-4-piperidyl sebacate light stabilizer for coatings available from BASF.

Tinuvin™ 400 is a 2-hydroxy-phenyl-s-triazone derivative UV absorber available from BASF>

DBTDL 1% in A100 is dibutyl tin dilaurate available from Air Products which was diluted with Aromatic 100.

Setulux 1903 is an acrylic polyol available commercially from Allnex.

TABLE 2

Millbase for Example Set 1
Millbase 1

| Item | Millbase | pph |
|---|---|---|
| 1 | IC3020[1] | 21.59 |
| 2 | Zoldine MS-Plus | 1.29 |
| 3 | Disperbyk 164 | 1.00 |
| 4 | BYK-A501 | 0.97 |
| 5 | Crayvallac Ultra | 1.37 |
| 6 | Ti-pure R960 | 24.97 |
| 7 | Microtalc IT Extra | 6.44 |
| 8 | Vulcan XC72R GP 3921 | 0.32 |
| 9 | MICRODOL EXTRA | 29.11 |
| 10 | MAK | 12.93 |

TABLE 3

Millbase 2 for Example Set 1
Millbase 2

| Item | Component | pph |
|---|---|---|
| 1 | Setalux 1903 | 21.59 |
| 2 | Zoldine + | 1.29 |
| 3 | Disperbyk 164 | 1.00 |
| 4 | BYK-A501 | 0.97 |
| 5 | Crayvallac Ultra | 1.37 |
| 6 | Ti-pure R960 | 24.97 |
| 7 | Microtalc IT Extra | 6.44 |
| 8 | Vulcan XC72R GP 3921 | 0.32 |

TABLE 3-continued

Millbase 2 for Example Set 1
Millbase 2

| Item | Component | pph |
|---|---|---|
| 9 | MICRODOL EXTRA | 29.11 |
| 10 | MAK | 12.93 |

Each millbase was made as follows:

The millbase was adjusted in scale to the total amount needed for testing. An appropriately sized steel vessel for a high-speed disperser was selected. A cowles blade whose diameter that was between 0.5 to 0.66 of the diameter of the steel vessel was attached to the high-speed disperser. Items 1 to 4 from Tables 2 and 3 were added and the disperser was set to 100 rpm with the blade level just below the surface of the liquid.

Once the liquid was uniform, items 5 through 9 from Tables 2 and 3 were added sequentially and slowly.

The speed of the disperser was increased in stages to 2500-3000 RPM during the additions. Some of item 10 from Tables 2 and 3 was added as needed to maintain good dispersion viscosity.

The millbase was held at this rpm until a temperature of >47 C was obtained for at least 10 min, and a Hegman reading of >6.5 was measured. Remaining material of item 10 was added slowly as the speed of the disperser was lowered to about 100-200 rpm The millbase was then stirred for an additional 10 minutes to ensure uniformity. The millbase was then transferred to a container and sealed until needed for formulations.

TABLE 4

Formulations for Example Set 1

| Item | Millbase | Example 1 Paint 1 pph | Example 1 Paint 2 pph |
|---|---|---|---|
| Millbase-1 | IC3020 | 54.80 | 0.00 |
| Millbase-32 | Nuplex 1903 | 0.00 | 55.09 |
| | Resins | | |
| 1 | IC3020 | 15.52 | 0.00 |
| 2 | Nuplex 1903 | 0.00 | 15.30 |
| | Let-down | | |
| 3 | BYK-306 | 0.03 | 0.03 |
| 4 | BYK 392 | 0.50 | 0.55 |
| 5 | Tinuvin 292 | 0.26 | 0.29 |
| 6 | Tinuvin 400 | 0.31 | 0.34 |
| 7 | DBTDL 1% in A100 | 1.31 | 1.43 |
| | Part B | | |
| 8 | DESMODUR N3390 BA/SN | 14.74 | 14.58 |
| Thin solvent | MAK | 12.52 | 12.39 |

Formulation Blending:

The size of the formula was scaled to that needed for testing. The millbase was added to an appropriately sized container. Under low shear agitation (3 blade propeller stirring) items 1 through 7 from Table 4, were added sequentially with a minimum of 2 minutes between item additions. The paint with no part "b" was then sealed in a jar. Just prior to paint application, item 8 from Table 4 and the thin solvent were added to the paint and mixed thoroughly.

Paints were applied using a heavy nap 4" wide polyamide roller. They were applied to each substrate to a wet film build of 7-9 mils as measured by a notch comb wet film build gauge available from PPG. Paint was applied to the following substrates:

TABLE 5

Panel Matrix Example Set 1

| Substrate | Size | # panels/paint |
|---|---|---|
| SBS | 4" × 6" | 6 |
| B1000 | 3" × 6" | 6 |

Figure 2:
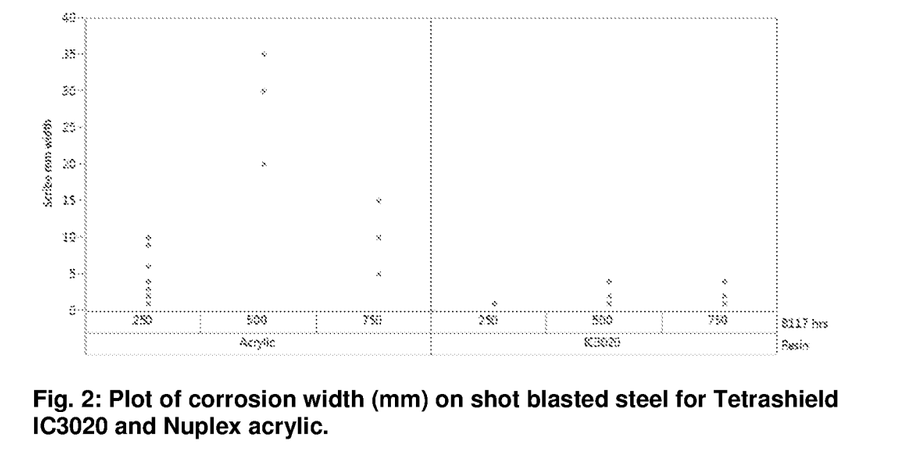
FIG. 2 is a plot of corrosion width (mm) on shot blasted steel for Tetrashield IC3020 and Nuplex acrylic.

Paints were cured and panels prepared for ASTM B117 corrosion as specified in the testing section above. Two panels from each paint were removed from ASTM B117 corrosion at 250, 500, and 750 hrs. The scribe corrosion is shown graphically in FIGS. 2-3.

On shot blasted steel (SBS) corrosion performance, as measured by scribe width, is very good for IC3020 coatings containing TMCD based polyester compared to the Nuplex 1903 coatings ("Acrylic in the charts"). However, on B1000, there is severe delamination along the scribe for both the acrylic and the TMCD polyester, see FIG. 1 and FIG. 2.

Experimental Set 2: Effect of Tosyl Urethane Modified Additives

This example set focuses on low molecular weight tosyl urethanes as additives for improved corrosion. Specifically, we are comparing mono alcohol (Ethylene glycol butyl ether or EB) fully reacted with PTSI to a triol (trimethoyl propane or TMP) reacted with PTSI. For the latter additive, only half of the OH groups of the TMP were reacted with PTSI, enabling the remaining OH groups to graft the PTSI into the resin matrix on crosslinking.

TABLE 6

Paint and Resin Descriptions for Example Set 2

| Paint code | Additive Description | Description | Level of tosyl urethane additive on total paint solids wt. % |
|---|---|---|---|
| E2P1 | none | IC30200 control | 0 |
| E2P2 | TMP PTSI | TMP PTSI at 0.5% on RS | 0.5% |
| E2P3 | TMP PTSI | TMP PTSI 1.0% on RS | 1.0 |
| E2P4 | TMP PTSI | TMP PTSI 2.0% on RS | 2 |
| E2P5 | EG PTSI | EG PTSI 0.5% on RS | 0.5 |
| E2P6 | EG PTSI | EG PTSI 1.0% on RS | 1.0 |
| E2P7 | EG PTSI | EG PTSI 2.0% on RS | 2.0 |

TABLE 7

Example Set 2 additive synthesis.

| Material | TMP-PTSI additive (parts by weight) | EB-PTSI additive (parts by weight) |
|---|---|---|
| Trimethoyl propane | 13.42 | 0.00 |
| Ethylene glycol butyl ether (EB) | 0 | 11.82 |
| Paratoluene sulfonyl isocyanate | 29.55 | 19.72 |
| Methl amyl ketone | 42.97 | 7.89 |

Additives were made by placing either the TMP or the EB into a jar with the MAK solution with ample space for the PTSI. The jar was then equipped with a 3-blade propeller stirrer and blanketed with a steady flow of dry nitrogen. The paratoluene sulfonyl isocyanate was then added dropwise over 20 minutes. A 10-20-degree Celsius exotherm was observed for these reactions. The propeller stirrer was removed and the jars were capped with a nitrogen blanket and allowed to cool overnight. Infrared (IR) spectroscopy was run on the solution to ensure that no remaining R—NCO was observable.

The final additive properties are shown below.

TABLE 8

Experimental Set 2 Additive properties

| Resin | Final OHEQ WT | Final % NV |
|---|---|---|
| TMP PTSI | 285 | 50 |
| EB PTSI | 0 | 80 |

Abbreviations:
Final OHEQ W T—The weight (in grams) of the final resin that contains one equivalent of OH groups.
Final % NV— The final % nonvolatile resin in the solution after the reactions and additions are complete.

For the paints in this test set, the millbase is shown in Table 9. Similar procedures as used for the millbases in Example Set 1 were used to make this millbase.

TABLE 9

Millbase (MB) for Example Set 2

| | Millbase 3 | | OH | | % Pigment | | % on | % Pigment | % resin |
|---|---|---|---|---|---|---|---|---|---|
| Item | Component | pph | Eq. Wt. | % NV | on solids | Eq. | solids | solids | solids |
| 1 | IC3020 | 21.59 | 374.0 | 75.0 | 0.0 | 0.269 | 20.06 | 0.00 | 81.47 |
| 2 | Zoldine+ | 1.29 | 92.5 | 100.0 | 0.0 | 0.086 | 1.60 | 0.00 | 6.49 |
| 3 | Disperbyk 164 | 1.00 | 0.0 | 60.0 | 0.0 | 0.000 | 0.74 | 0.00 | 3.02 |
| 4 | BYK-A501 | 0.97 | 0.0 | 44.0 | 0.0 | 0.000 | 0.53 | 0.00 | 2.14 |
| 5 | Crayvallac Ultra | 1.37 | 0.0 | 100.0 | 0.0 | 0.000 | 1.70 | 0.00 | 6.89 |
| 6 | Ti-pure R960 | 24.97 | 0.0 | 100.0 | 100.0 | 0.000 | 30.93 | 41.04 | 0.00 |
| 7 | Microtalc IT Extra | 6.44 | 0.0 | 100.0 | 100.0 | 0.000 | 7.98 | 10.59 | 0.00 |
| 8 | Vulcan XC72R GP 3921 | 0.32 | 0.0 | 100.0 | 100.0 | 0.000 | 0.40 | 0.53 | 0.00 |
| 9 | MICRODOL EXTRA | 29.11 | 0.0 | 100.0 | 100.0 | 0.000 | 36.06 | 47.84 | 0.00 |
| 10 | MAK | 12.93 | 0.0 | 0.0 | 0.0 | 0.000 | 0.00 | 0.00 | 0.00 |

The paints for this series were made and applied for corrosion testing as per paints in Example set 1. The formulas are shown in Table 10.

TABLE 10

Paints for Example Set 2
All units are parts by weight

| Item | Component | E2P1 | E2P2 | E2P3 | E2P4 | E2P5 | E2P6 | E2P7 |
|---|---|---|---|---|---|---|---|---|
| 1 | Millbase 3 Resins | 54.8 | 54.79 | 54.78 | 54.77 | 54.79 | 54.8 | 54.83 |
| 2 | IC3020 | 15.45 | 15.25 | 15.04 | 14.62 | 15.33 | 15.21 | 14.94 |
| 3 | TMP PTSI | 0.00 | 0.29 | 0.57 | 1.15 | 0.00 | 0.00 | 0.00 |
| 4 | EB PTSI Let-down | 0.00 | 0.00 | 0.00 | 0.00 | 0.18 | 0.36 | 0.72 |
| 7 | BYK-306 | 0.03 | 0.03 | 0.03 | 0.03 | 0.03 | 0.03 | 0.03 |
| 8 | BYK 392 | 0.55 | 0.55 | 0.55 | 0.55 | 0.55 | 0.55 | 0.55 |
| 9 | Tinuvin 292 | 0.29 | 0.29 | 0.29 | 0.29 | 0.29 | 0.29 | 0.29 |

TABLE 10-continued

Paints for Example Set 2
All units are parts by weight

| Item | Component | E2P1 | E2P2 | E2P3 | E2P4 | E2P5 | E2P6 | E2P7 |
|---|---|---|---|---|---|---|---|---|
| 10 | Tinuvin 400 | 0.34 | 0.34 | 0.34 | 0.34 | 0.34 | 0.34 | 0.34 |
| 11 | DBTDL 1% in A100 Part B | 1.43 | 1.44 | 1.44 | 1.44 | 1.43 | 1.43 | 1.43 |
| 12 | DESMODUR N3390 BA/SN | 14.71 | 14.73 | 14.75 | 14.78 | 14.65 | 14.59 | 14.47 |
| 14 | MAK | 12.39 | 12.3 | 11.21 | 12.02 | 12.39 | 12.39 | 12.4 |

TABLE 11

Panel matrix for Example Set 2

| Substrate | Size | # panels/paint |
|---|---|---|
| B1000 | 3" × 6" | 4 |

Paints were cured and prepared for ASTM B117 corrosion as specified in the testing section above. Two panels from each paint and substrate were removed from ASTM B117 corrosion at 250, and 750 hrs. The scribe corrosion is plotted in FIG. 3 and FIG. 4.

Figure 3:
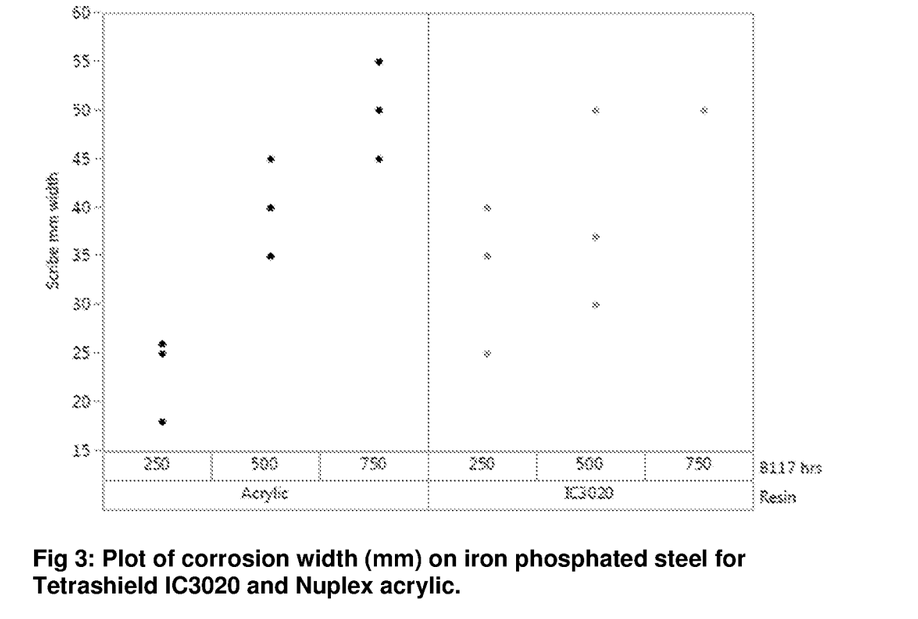
FIG. 3 is a plot of corrosion width (mm) on iron phosphated steel for Tetrashield IC3020 and Nuplex acrylic.
Figure 4:
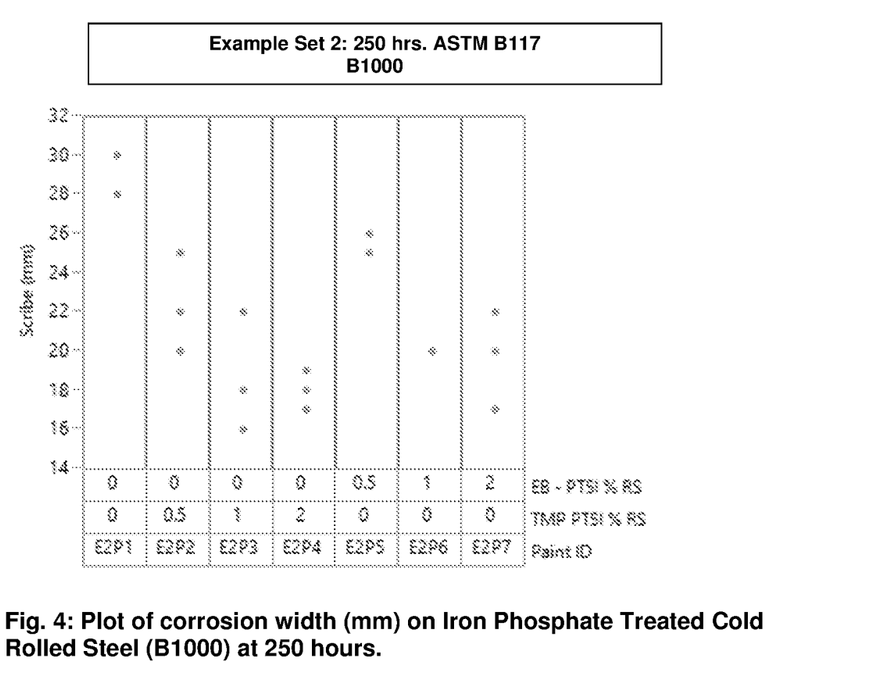
FIG. 4 is a plot of corrosion width (mm) on Iron Phosphate Treated Cold Rolled Steel (B1000) at 250 hours.

As depicted in FIG. 3 and FIG. 4, corrosion improves when the tosyl urethane additives are incorporated into the paint formulation. At 750 hrs. ASTM B117 corrosion, the TMP-PTSI additive shows significantly better corrosion improvement than the EB-PTSI additive, see FIG. 4.

Experimental Set 3: Effect of Tosyl Urethane Modified Additives

This example set combines the grafted resin and the tosyl urethane additive to demonstrate synergy between the two approaches

TABLE 12

Paint and Resin Descriptions for Example Set 3

| Paint code | Additive Description | Description | Level tosyl urethane additive on total resin solids wt. % |
|---|---|---|---|
| E3P1 | none | IC30200 control | 0 |
| E3P2 | TMP PTSI | TMP PTSI at 1.0% on RS | 1.0 |
| E3P3 | none | PTSI grafted onto main resin | 0 |
| E3P4 | TMP PTSI | TMP PTSI 1.0% on RS plus PTSI grafted onto main resin | 1.0 |

The TMP PTSI additive was the same additive as used in example set 2.

The grafted resin was made as shown below:

TABLE 13

Example Set 3 graft resins composition.

| Resin | Grams IC3020 | Grams PTSI | gram n-BA | wt. % graft on resin solids |
|---|---|---|---|---|
| E3R1 - Grafted PTSI resin | 500.00 | 79.21 | 26.40 | 17.44% |

The grafted resin was made by placing the IC3020 solution into a jar with ample space for the PTSI and additional n-butyl acetate. The jar was then equipped with a 3-blade propeller stirrer and blanketed with a steady flow of dry nitrogen. The isocyanate was then added dropwise over 20 minutes. A 10-20-degree Celsius exotherm was observed for these reactions. Additional n-butyl acetate was added to bring the resulting resins to 75% NV. The propeller stirrer was removed and the jars were capped with a nitrogen blanket and allowed to cool overnight. IR spectroscopy was run on the solution to ensure that no remaining R—NCO was observable.

The final resin properties are shown below. These properties were calculated based on IC3020 OH #150 on resin solids and initially at 75% NV in n-butyl acetate, and the NCO equivalent weight of the different mono-isocyanates used for grafting.

TABLE 14

Experimental Set 3 graft resin properties

| Resin | EQ OH | EQ NCO | Final EQ OH | Final OHEQ WT | Final % NV |
|---|---|---|---|---|---|
| E3R1 | 1.003 | 0.402 | 0.601 | 756.3 | 75.00 |

Abbreviations:

EQ OH—The equivalent of OH groups on the resin from the original resin charge.

EQ NCO—The equivalent of NCO groups on the isocyanate from the original isocyanate charge.

Final EQ OH—The final equivalents of hydroxyl after the isocyanate/OH reaction is complete.

Final OHEQ W T—The weight (in grams) of the final resin that contains one equivalent of OH groups.

Final % NV—The final % nonvolatile resin in the solution after the reactions and additions are complete.

For the paints in this test set, the millbase is shown in Table 15. Similar procedures as used for the millbases in Example Set 1 were used to make this millbase.

TABLE 15

Millbase (MB) for Example Set 3

| | Millbase 4 | | OH | | % Pigment | | % on | % Pigment | % resin |
|---|---|---|---|---|---|---|---|---|---|
| Item | Component | pph | Eq. Wt. | % NV | on solids | Eq. | solids | solids | solids |
| 1 | IC3020 | 21.59 | 374.0 | 75.0 | 0.0 | 0.269 | 20.06 | 0.00 | 81.47 |
| 2 | Zoldine+ | 1.29 | 92.5 | 100.0 | 0.0 | 0.086 | 1.60 | 0.00 | 6.49 |
| 3 | Disperbyk 164 | 1.00 | 0.0 | 60.0 | 0.0 | 0.000 | 0.74 | 0.00 | 3.02 |
| 4 | BYK-A501 | 0.97 | 0.0 | 44.0 | 0.0 | 0.000 | 0.53 | 0.00 | 2.14 |
| 5 | Crayvallac Ultra | 1.37 | 0.0 | 100.0 | 0.0 | 0.000 | 1.70 | 0.00 | 6.89 |
| 6 | Ti-pure R960 | 24.97 | 0.0 | 100.0 | 100.0 | 0.000 | 30.93 | 41.04 | 0.00 |
| 7 | Microtalc IT Extra | 6.44 | 0.0 | 100.0 | 100.0 | 0.000 | 7.98 | 10.59 | 0.00 |
| 8 | Vulcan XC72R GP 3921 | 0.32 | 0.0 | 100.0 | 100.0 | 0.000 | 0.40 | 0.53 | 0.00 |
| 9 | MICRODOL EXTRA | 29.11 | 0.0 | 100.0 | 100.0 | 0.000 | 36.06 | 47.84 | 0.00 |
| 10 | MAK | 12.93 | 0.0 | 0.0 | 0.0 | 0.000 | 0.00 | 0.00 | 0.00 |

The paints for this series were made and applied for corrosion testing as per paints in Example set 1. The formulas are shown in Table 16.

TABLE 16

Paints for Example Set 3
All units are parts by weight

| Item | Component | E3P1 | E3P2 | E3P3 | E3P4 |
|---|---|---|---|---|---|
| 1 | Millbase 4 | 54.8 | 54.79 | 54.81 | 54.80 |
| | Resins | | | | |
| 2 | IC3020 | 15.45 | 15.25 | 0 | 0 |
| 3 | TMP PTSI | 0.00 | 0.29 | 0 | 0.57 |
| | E3R1 Let-down | 0 | 0 | 18.08 | 17.59 |
| 7 | BYK-306 | 0.03 | 0.03 | 0.03 | 0.03 |
| 8 | BYK 392 | 0.55 | 0.55 | 0.55 | 0.55 |
| 9 | Tinuvin 292 | 0.29 | 0.29 | 0.29 | 0.29 |
| 10 | Tinuvin 400 | 0.34 | 0.34 | 0.34 | 0.34 |

TABLE 16-continued

Paints for Example Set 3
All units are parts by weight

| Item | Component | E3P1 | E3P2 | E3P3 | E3P4 |
|---|---|---|---|---|---|
| 11 | DBTDL 1% in A100 Part B | 1.43 | 1.44 | 1.43 | 1.43 |
| 12 | DESMODUR N3390 BA/SN | 14.71 | 14.73 | 11.82 | 11.94 |
| 14 | MAK | 12.39 | 12.3 | 12.64 | 12.45 |

TABLE 17

Panel matrix for Example Set 3

| Substrate | Size | # panels/paint |
|---|---|---|
| B1000 | 3" × 6" | 4 |

Figure 5:
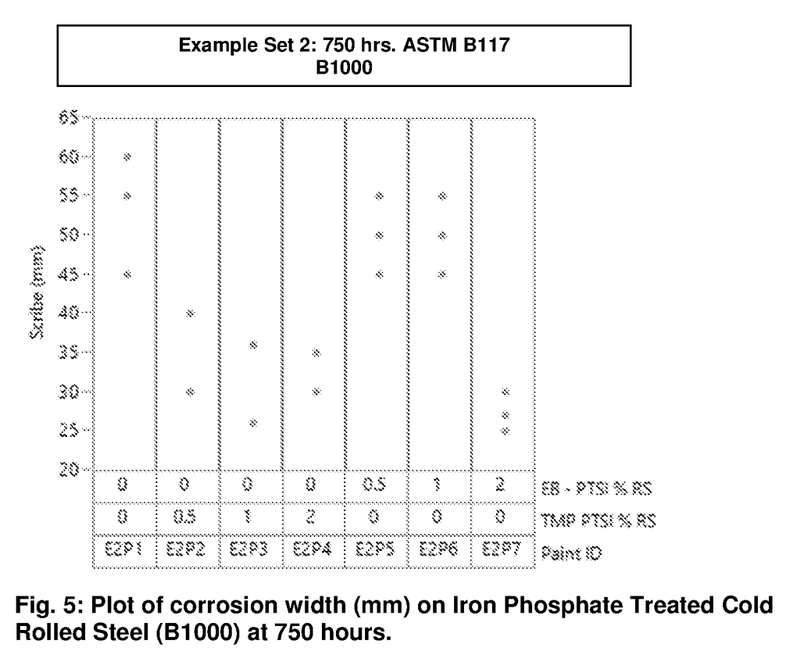
FIG. 5 is a plot of corrosion width (mm) on Iron Phosphate Treated Cold Rolled Steel (B1000) at 750 hours.
Figure 6:
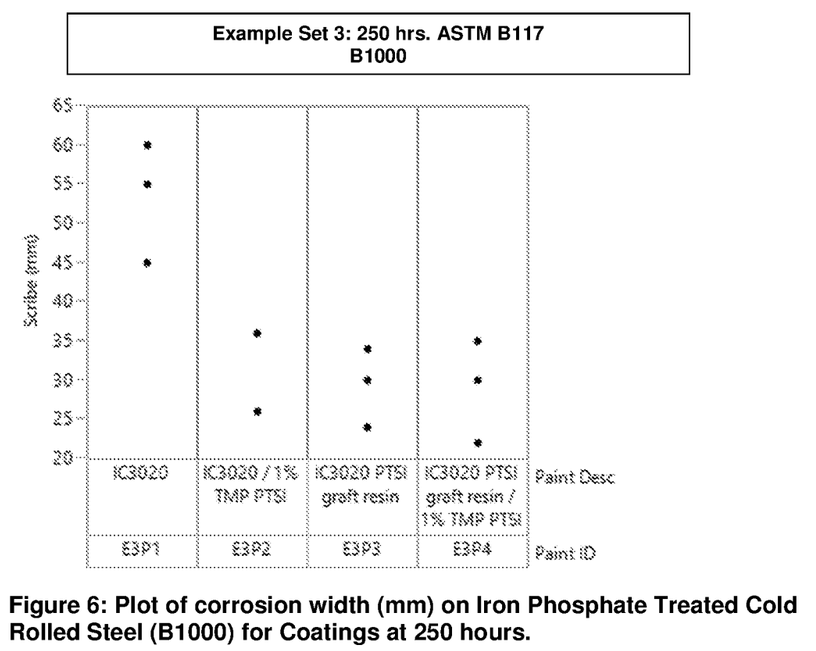
FIG. 6 is a plot of corrosion width (mm) on Iron Phosphate Treated Cold Rolled Steel (B1000) for Coatings at 250 hours.
Figure 7:
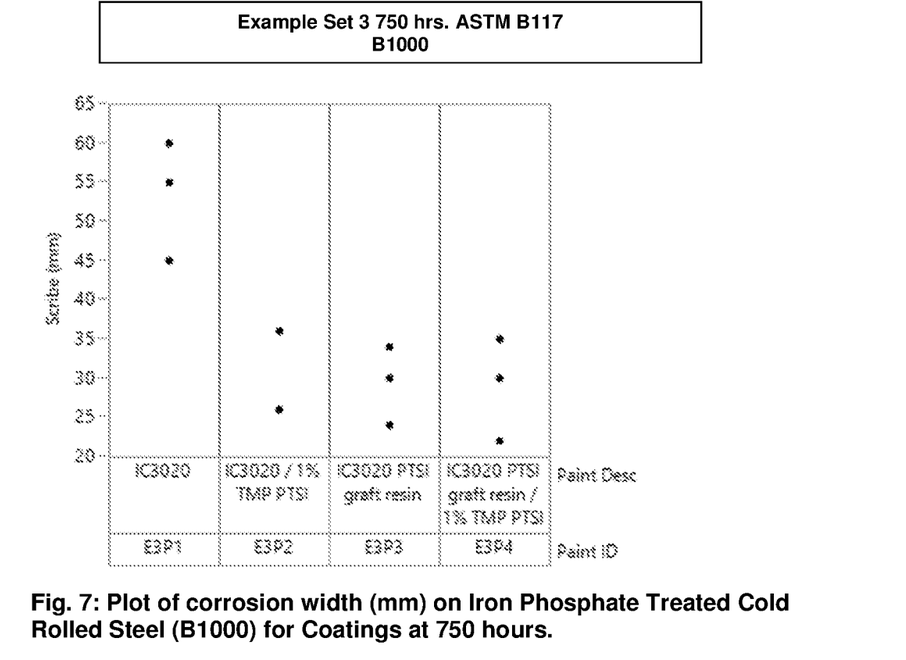
FIG. 7 is a plot of corrosion width (mm) on Iron Phosphate Treated Cold Rolled Steel (B1000) for Coatings at 750 hours.

Paints were cured and prepared for ASTM B117 corrosion as specified in the testing section above. Two panels from each paint and substrate were removed from ASTM B117 corrosion at 250, and 750 hrs. The scribe corrosion is plotted FIG. 5 and FIG. 6.

As shown, especially in early onset corrosion (250 hrs.), there is improved corrosion resistance when both the grafted PTSI resin and the TMP-PTSI additive are used in the paint formulas.

The invention has been described in detail with reference to the embodiments disclosed herein, but it will be understood that variations and modifications can be effected within the spirit and scope of the invention. It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category, can also be applied to species within the genus or members of the category, unless otherwise noted.

We claim:

1. A coating composition for inhibiting corrosion of a metal substrate comprising:
    a. at least one acrylic resin comprising residues of an acrylic polyol and an aromatic sulfonyl isocyanate wherein said resin has not more than 25 percent sulfonyl urethane groups and not less than 75 percent remaining hydroxyl groups;
    b. a sulfonyl urethane-alcohol reaction product of a polyalcohol with an aromatic sulfonyl isocyanate, wherein said reaction product has 33-67% sulfonyl urethane groups and 67-33% alcohol groups, wherein said aromatic sulfonyl isocyanate is selected from the group consisting of paratoluenesulfonyl isocyanate, benzyl methyl ester sulfonyl isocyanate, and benzyl sulfonyl isocyanate compound;
    c. a solvent other than water; and
    d. a crosslinker comprising a poly isocyanate, wherein said isocyanate is selected from the group consisting of an aliphatic poly isocyanate; an aromatic poly isocyanate, an aliphatic isocyanate; an aromatic isocyanates and mixtures thereof.

2. A coating composition for improving the corrosion resistance of a metal substrate comprising:
    a. at least one polyester resin comprising residues of a polyester polyol and an aromatic sulfonyl isocyanate wherein said resin has not more than 25 percent sulfonyl urethane groups and not less than 75 percent hydroxyl groups;
    b. a sulfonyl urethane-alcohol reaction product of a polyalcohol with an aromatic sulfonyl isocyanate, wherein said reaction product has 33-67% sulfonyl urethane groups and 67-33% alcohol groups, wherein said aromatic sulfonyl isocyanate is selected from the group consisting of paratoluenesulfonyl isocyanate, benzyl methyl ester sulfonyl isocyanate, and benzyl sulfonyl isocyanate compound;
    c. a solvent other than water; and
    d. a crosslinker comprising a poly isocyanate, wherein said isocyanate is selected from the group consisting of an aliphatic poly isocyanate; an aromatic poly isocyanate, an aliphatic isocyanate; an aromatic isocyanates and mixtures thereof.

3. The coating composition of claim 2 further comprising e) an ungrafted aromatic sulfonyl isocyanate.

4. A method of improving the corrosion resistance of a metal substrate comprising:
    a. forming a polyester resin, wherein said resin has free hydroxyl groups;
    b. reacting an aromatic sulfonyl isocyanate with said resin to form a grafted polyester resin wherein said grafted polyester resin has not more than 25 percent sulfonyl urethane groups and not less than 75 percent hydroxyl groups;
    c. reacting an aromatic sulfonyl isocyanate with a polyalcohol to form a sulfonyl urethane-alcohol compound reaction product, wherein said sulfonyl urethane-alcohol compound reaction product has 33-67% percent sulfonyl urethane groups and 67-33% alcohol groups;
    d. combining said grafted polyester and said sulfonyl urethane-alcohol reaction product with a coating composition; and
    e. coating a metal substrate with said combined grafted polyester, sulfonyl urethane-alcohol reaction product and coating composition; and
    wherein said aromatic sulfonyl isocyanate is selected from the group consisting of paratoluenesulfonyl isocyanate, benzyl methyl ester sulfonyl isocyanate, and benzyl sulfonyl isocyanate.

5. The method of claim 4 further comprising the step of combining an ungrafted aromatic sulfonyl isocyanate with said grafted polyester, and sulfonyl urethane-alcohol reaction product and said coating composition, prior to coating said metal substrate.

6. A method of improving the corrosion resistance of a metal substrate comprising:
    a. forming an acrylic polyol resin, wherein said acrylic polyol resin has free hydroxyl groups;
    b. reacting an aromatic sulfonyl isocyanate with said acrylic polyol resin to form a grafted acrylic polyol resin wherein said grafted acrylic polyol resin has not more than 25 percent sulfonyl urethane groups and not less than 75 percent hydroxyl groups;
    c. reacting an aromatic sulfonyl isocyanate with a polyalcohol to form a sulfonyl urethane-alcohol reaction product wherein said sulfonyl urethane-alcohol reaction product has 33-67% percent sulfonyl urethane groups and 67-33% alcohol groups;

d. combining said grafted acrylic polyol resin and said sulfonyl urethane-alcohol reaction product with a coating composition; and
e. coating said metal substrate with said combined grafted acrylic polyol resin, sulfonyl urethane-alcohol reaction product and coating composition; and
   wherein said aromatic sulfonyl isocyanate is selected from the group consisting of paratoluenesulfonyl isocyanate, benzyl methyl ester sulfonyl isocyanate, and benzyl sulfonyl isocyanate.

7. The method of claim 6 further comprising the step of combining an ungrafted aromatic sulfonyl isocyanate with said grafted polyester and said coating composition, prior to coating said metal substrate.

* * * * *